United States Patent [19]
Sing

[11] Patent Number: 5,958,239
[45] Date of Patent: Sep. 28, 1999

[54] MULTI-LEVEL SEPTIC DRAINFIELDS

[76] Inventor: Peter Sing, P.O. Box 11532, Winslow, Wash. 98110

[21] Appl. No.: 08/783,191

[22] Filed: Jan. 15, 1997

[51] Int. Cl.⁶ ........................................................ C02F 3/30
[52] U.S. Cl. ........................... 210/605; 210/617; 210/150; 210/170; 210/262; 210/532.2
[58] Field of Search ...................... 210/150, 151, 210/170, 255, 261, 262, 258, 259, 265, 284, 286, 532.2, 605, 617, 630, 747; 405/36

[56] References Cited

U.S. PATENT DOCUMENTS

| | | | | |
|---|---|---|---|---|
| 606,592 | 6/1898 | Snell | ....................... | 210/286 |
| 853,217 | 5/1907 | Bordigoni | ............... | 210/150 |
| 2,992,986 | 7/1961 | Ingram | .................... | 210/150 |
| 3,029,950 | 4/1962 | Frasca | ..................... | 210/284 |
| 3,919,848 | 11/1975 | Sullivan | .................. | 210/170 |
| 4,013,559 | 3/1977 | Johnson | ................... | 210/151 |
| 4,427,548 | 1/1984 | Quick, Jr. | ................. | 210/150 |
| 4,465,594 | 8/1984 | Laak | ......................... | 210/151 |
| 4,997,568 | 3/1991 | Vandervelde et al. | ................... | 210/170 |
| 5,049,265 | 9/1991 | Boyd et al. | .............................. | 210/150 |
| 5,223,129 | 6/1993 | Hsieh | ...................... | 210/150 |
| 5,547,589 | 8/1996 | Carroll, II | ............................ | 210/532.2 |

*Primary Examiner*—Christopher Upton
*Attorney, Agent, or Firm*—Nathaniel Altman

[57] ABSTRACT

Multi-level drainfields for purifying septic tank liquid effluent have a plurality of vertically-stacked filtration medium layers with air space therebetween. The space-saving drainfield modules may be custom-fitted in size, number, type and thickness of layers to meet the requirements of a home, family and habits. Effluent may be percolated through each filtration layer, which may contain baffles, from top down or bottom up, in series or in parallel, and may be recirculated, if necessary, to render the effluent safe for discharge as clean ground water. Drainfield modules may be combined for high-capacity effluent handling, and may be installed underground or aboveground, where protective housing can permit light to reach the effluent therein.

16 Claims, 4 Drawing Sheets

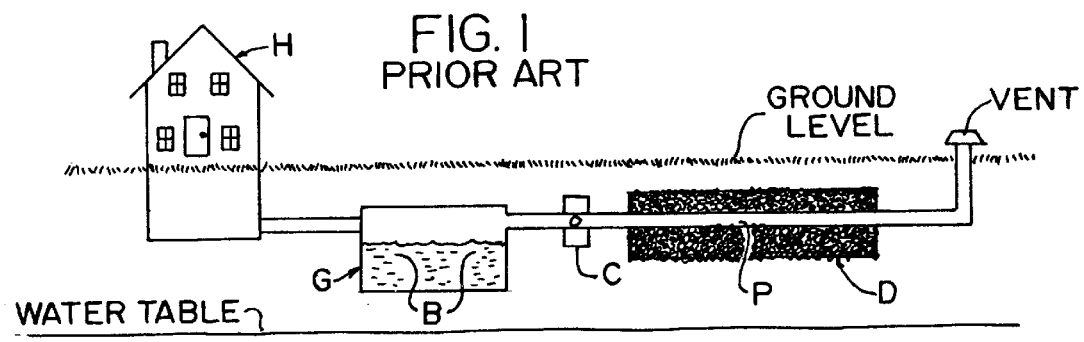
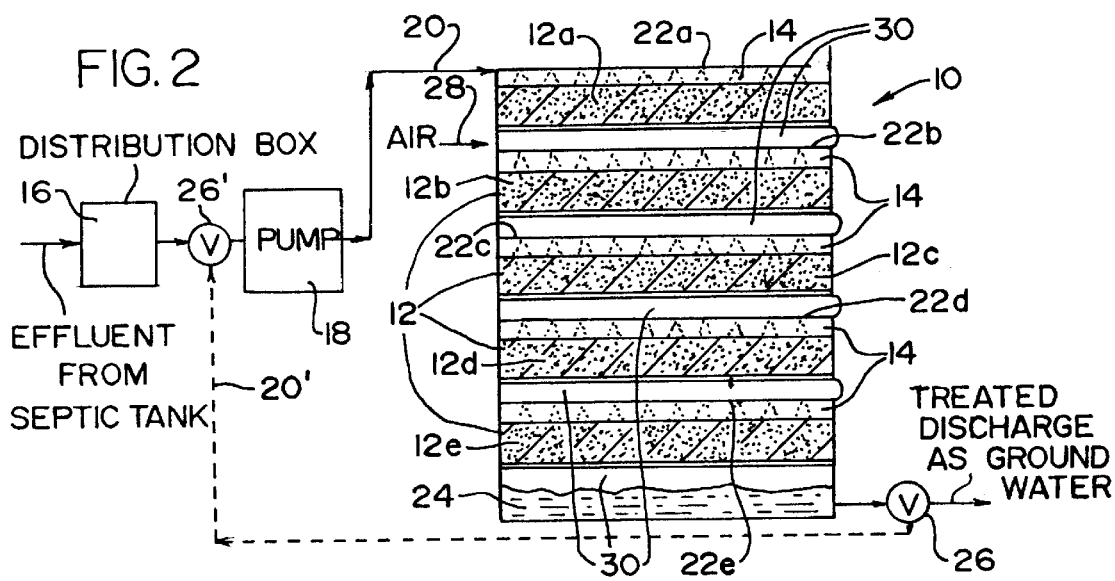
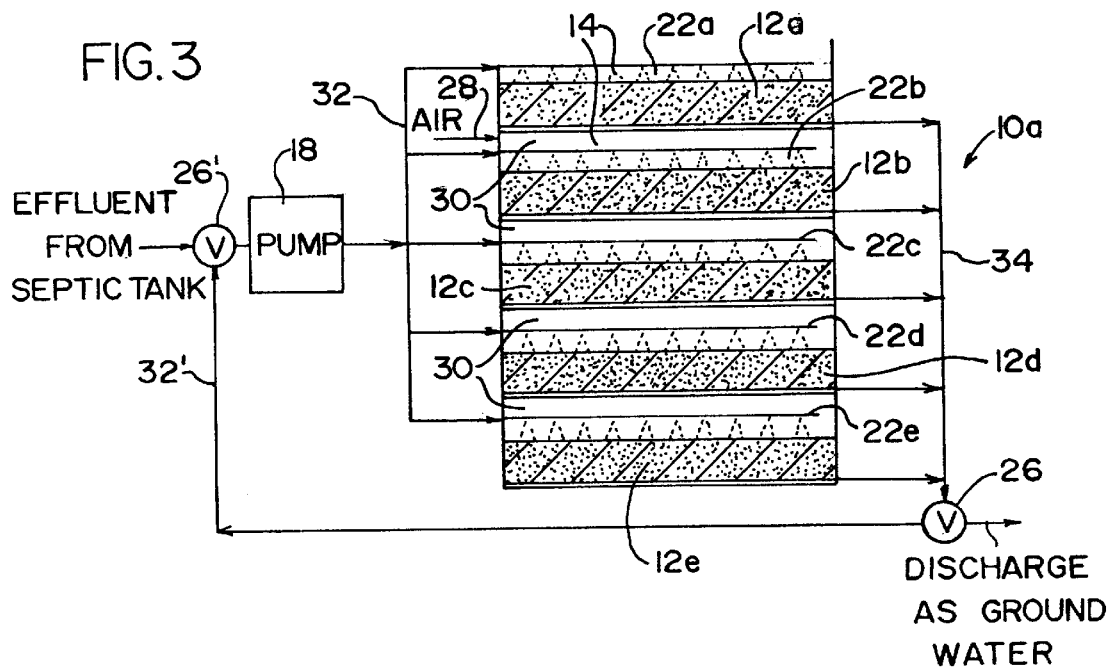

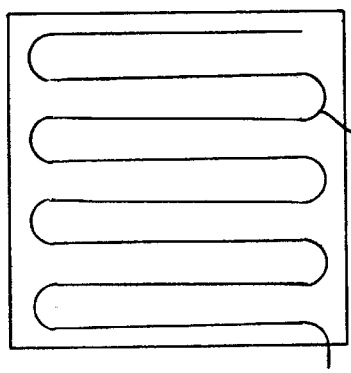
FIG. 4
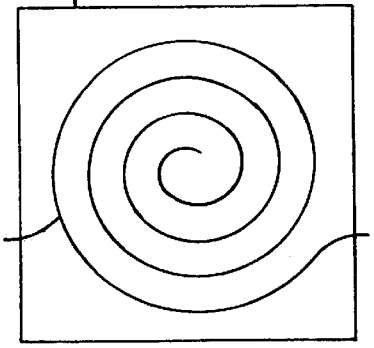
FIG. 5
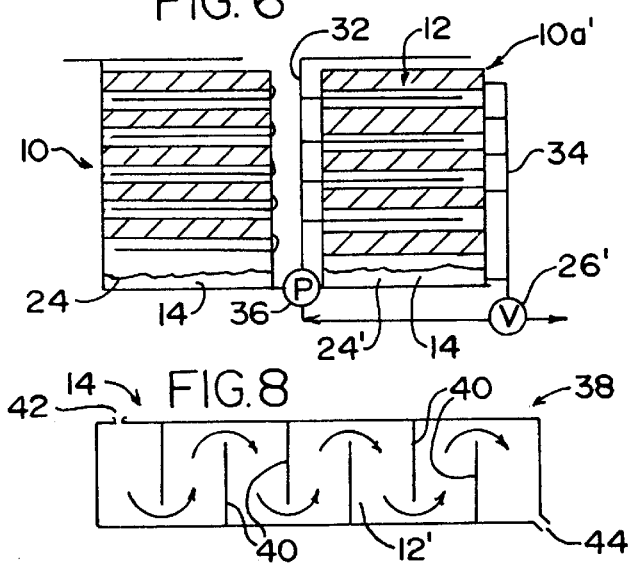
FIG. 6
FIG. 8
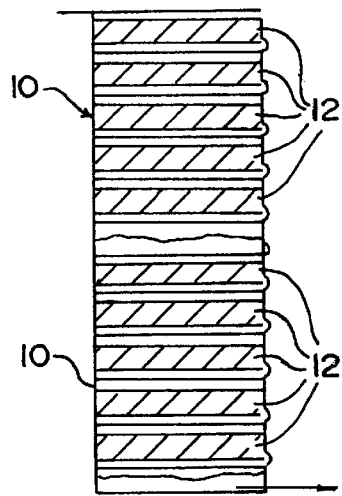
FIG. 7
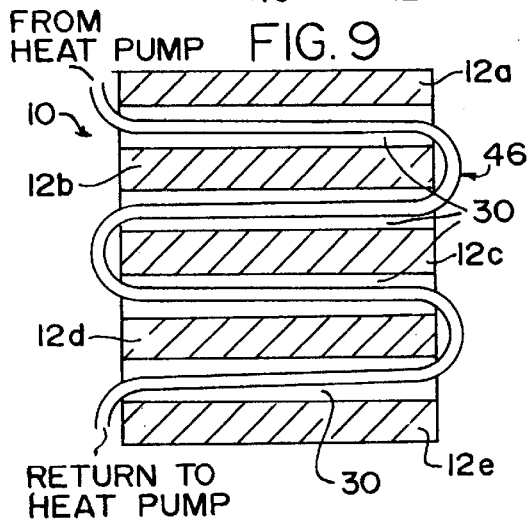
FIG. 9
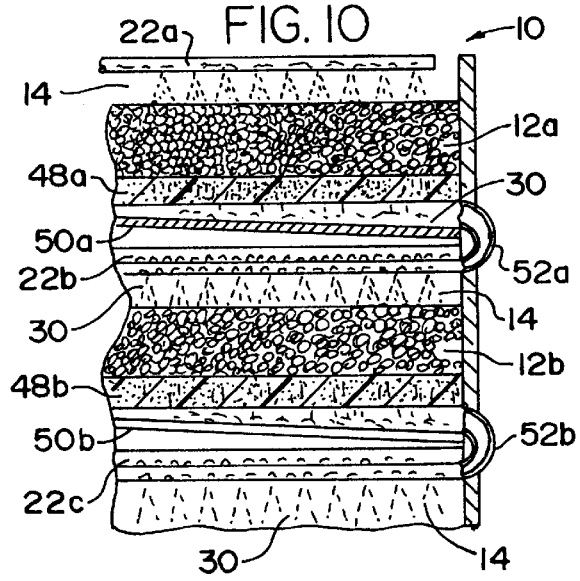
FIG. 10

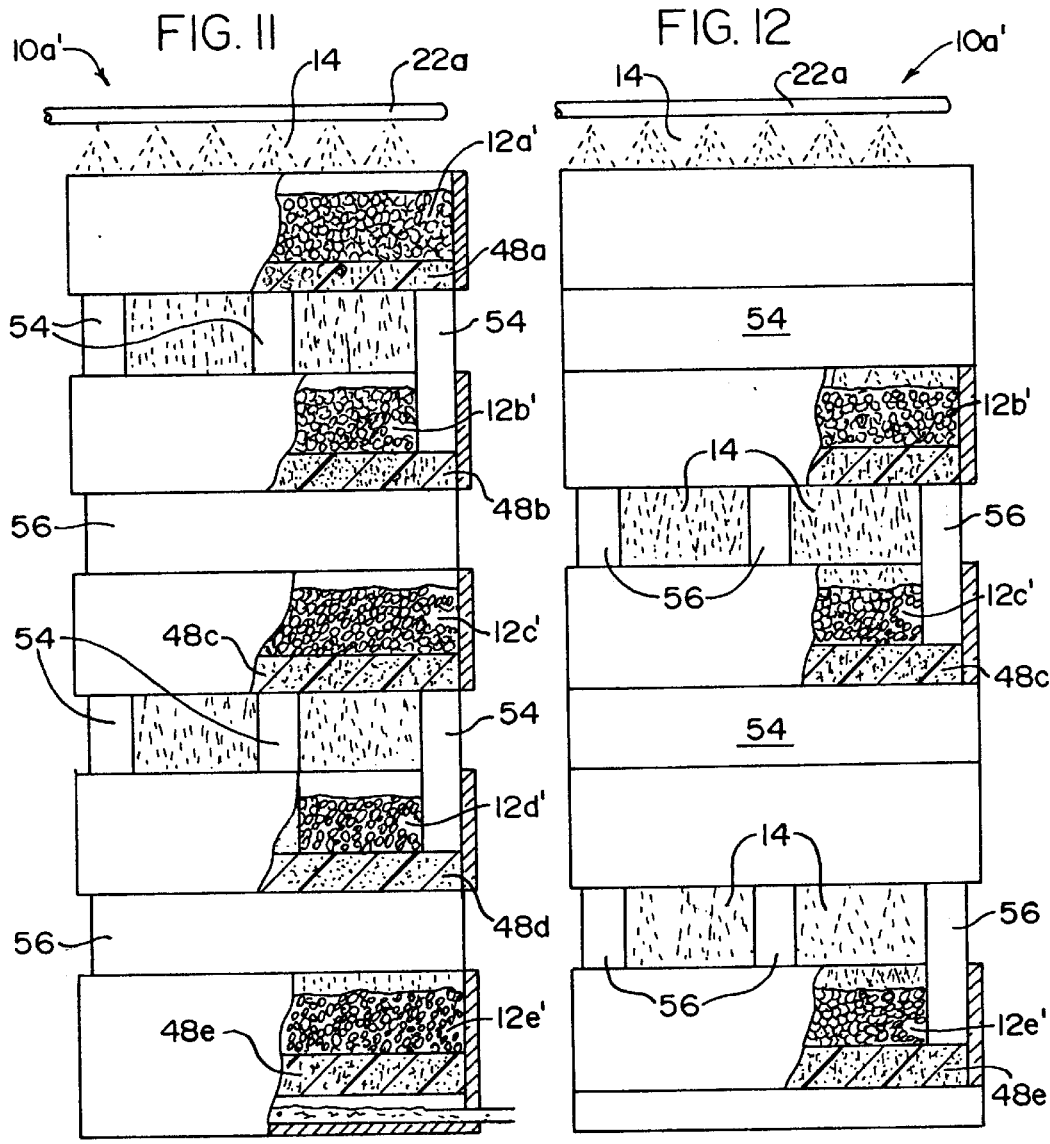
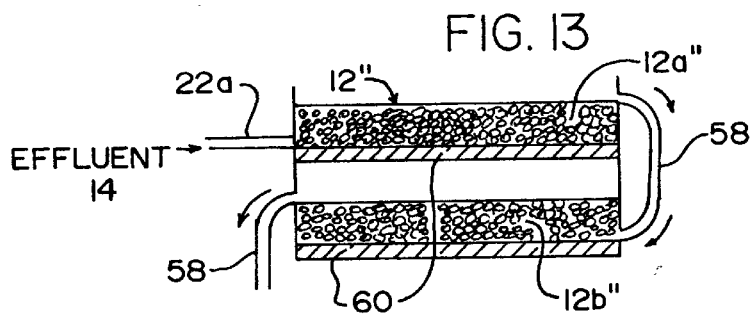

MULTI-LEVEL SEPTIC DRAINFIELDS

BACKGROUND OF THE INVENTION

1. Field of the Invention

This invention is concerned with septic drainfields for the treatment of liquid effluent discharged from septic tanks handling household sewage. More specifically, this invention relates to drainfields constructed in multi-level layers.

2. Description of the Prior Art

Current prior art practice is illustrated in FIG. 1 of the accompanying drawings, wherein sewage from house H is delivered to underground septic tank S and separated, with the aid of baffles B and gravity, into supernatant scum, sludge settled to the tank bottom, and liquid effluent, which emerges from tank S and is carried through distribution box C and pumped through perforated distribution pipe P, to be spread on soil absorption bed or drainfield D. The drainfield acts as a filtration medium for the liquid effluent, removing suspended matter therefrom; the drainfield also serves as a chemical reaction medium wherein the degradation and oxidation of noxious or unpleasant compounds in the effluent occurs; most importantly, the drainfield provides a culture medium for soil bacteria, which flourish and form a slime coating the particles of the soil absorption bed. The drainfield thereby becomes a deathtrap to dangerous health-imperiling viruses, which are removed from the effluent by being either held in the bacterial slime or trapped on the soil particles' surfaces, long enough for the viruses to be digested by the bacteria or to be neutralized and rendered harmless. Thereby, the treated liquid effluent may pass safely from the drainfield into the surrounding soil and eventually join the surrounding ground water without contaminating nearby wells or streams.

The requirements for successful and safe conventional drainfield operation are rigidly controlled by local and state health authorities to prevent the spread of infectious diseases by water supply contamination. These requirements include: 1) a drainfield area large enough to accommodate safely the maximum volume of sewage effluent generated by the household involved; 2) a drainfield soil with a pore size and structure such that the liquid effluent will percolate therethrough at a filtration rate in the range of but not exceeding one inch per hour; 3) a drainfield thickness of at least four and one-half feet, situated above the seasonal high groundwater table; and 4) a drainfield not in low areas where rain or snow accumulation can overflow the system, and not on steep slopes.

Many potential homesites in non-sewer areas cannot meet the above drainfield requirements because of inadequate soil characteristics or unsatisfactory available area or location therefor, and thus cannot be developed with conventional sewage disposal methods without major land reconfiguration and major expense. Even for existing drainfields, which require consistent maintenance and eventual digging out and replacement when they become saturated and spent, costs can run prohibitively high.

SUMMARY OF THE INVENTION

The present invention provides drainfields having a plurality of horizontal filtration-media layers stacked in vertical array with air space therebetween, permitting the circulation of air to stimulate the oxidation-purification processes occurring in the septic tank liquid effluent as it percolates through each filtration layer of the drainfield. The effluent may be dripped on, sprayed on, or siphoned through each filtration layer either in series or in parallel, and may be recirculated through some or all of the layers more than once. The filtration medium used in the layers may be uniform in composition, thickness and flow characteristics, or may be varied to meet the needs of any given system, and the number of layers may be selected for the most efficient operation of each drainfield.

Multi-level drainfields of this invention may be installed either aboveground or underground; in either case, they provide the advantage of occupying a far smaller area and operating more efficiently than a conventional prior art drainfield of equivalent capacity. When constructed aboveground, the favorable conditions for bacterial action, virus removal by digestion or retention, and effective effluent purification, including air circulation and warmth generated by the chemical and biological processes as well as sun, may be augmented by providing light to create a greenhouse effect.

It is the primary object of this invention to provide multi-level drainfields for septic effluent treatment which require minimum land area, which are highly flexible and adaptable to custom-fit the requirements of each installation, and which are efficient and less costly to install and maintain than conventional septic installations.

Full details of the concepts and preferred embodiments of this invention will be hereinafter disclosed and described in connection with the accompanying illustrative, but not limiting, drawings, wherein:

BRIEF DESCRIPTION OF THE DRAWINGS

FIG. 1 is a schematic view of a typical prior-art home sewage treatment system;

FIG. 2 is a schematic view of a multi-level drainfield of this invention, with the filtration medium layers being used in series;

FIG. 3 is a schematic view of a multi-level drainfield with the filtration medium layers being used in parallel;

FIG. 4 is a schematic top plan view of one layer of the drainfield of FIG. 2 or 3 showing an effluent distribution means;

FIG. 5 is a schematic view similar to FIG. 4 showing another effluent distribution means;

FIG. 6 is a schematic view of two drainfield modules operatively connected in side-by-side relationship;

FIG. 7 is a schematic view of two drainfield modules operatively connected in vertical stacking relationship;

FIG. 8 is a schematic view of a single filtration medium layer with baffles added to direct the flow of effluent therethrough;

FIG. 9 is a schematic view of a drainfield module being used as an energy source for a heat pump;

FIG. 10 is a partial vertical section taken through a portion of a drainfield module;

FIGS. 11 and 12 are front and side elevational views, respectively, of a drainfield module showing structural supports therefor;

FIG. 13 is a partial schematic view of a drainfield module with the effluent being introduced at the bottom of each drainfield layer and siphoned from the top thereof to its adjacent layer.

DESCRIPTION OF THE PREFERRED EMBODIMENTS

Figure 14:
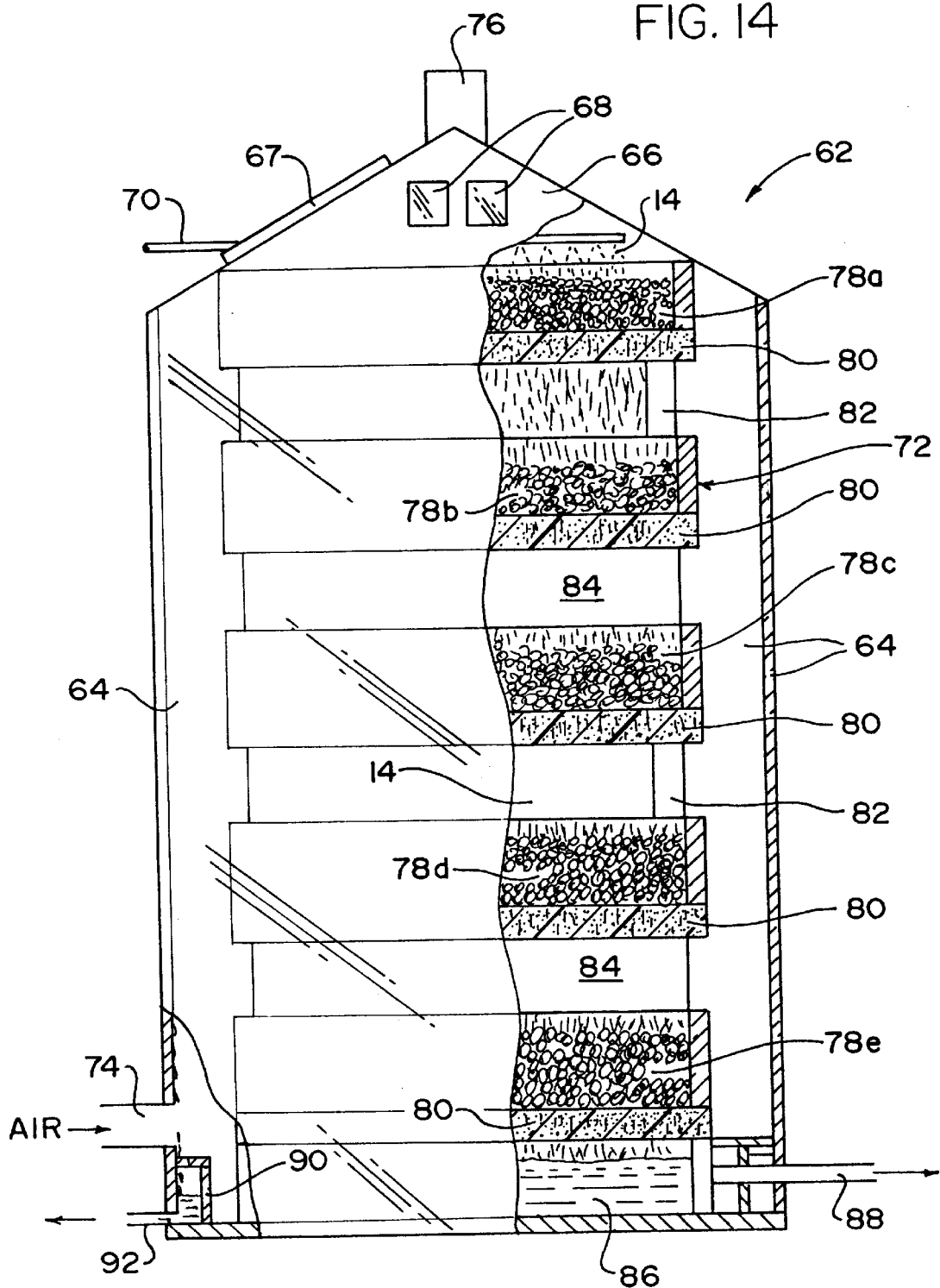
FIG. 14 is an elevational view, partially broken away, of an aboveground drainfield housed in a translucent structure.

While all the drainfield module embodiments described in this specification and shown in the drawings illustratively have five filtration layers, a smaller or larger number of layers may be used, to be determined by consideration of all the factors involved in each drainfield installation. The major considerations to be taken into account are: 1) the estimated maximum volume of effluent to be treated daily, based on home and family size and family household activities; 2) the land area to be assigned for drainfield use: it is contemplated that multi-level drainfields, and hence filtration bed areas, may range from approximately fifteen square feet plots to at least four hundred square feet plots; 3) the thickness of filtration medium in each filtration layer and the number of layers: it is contemplated that each layer may range in thickness from approximately two to twenty-four inches; and 4) the composition and character of the filtration medium used for the layers, which may be composed of percolable soil, sand, coal, gravel, percolable natural (e.g. sawdust), and synthetic (e.g. foamed resin) particles, and mixtures of the above adjusted to control the percolation- or flow-time of effluent therethrough, allowing sufficient effluent contact time to ensure full digestion or neutralization of viruses or harmful bacteria. Effluent flow-time through each filtration layer may be slowed by utilizing baffles therein to channel the effluent, whether fed from top or bottom of the layer. It is to be noted that where the filtration layers of a multi-level drainfield are in series, the effluent percolation rate of all layers must be essentially the same to avoid back-ups and spill-overs; in parallel, the individual filtration beds may vary and may be graduated as well.

As shown in FIG. 2, multi-level drainfield modular structure 10 comprises five vertically aligned and spaced filtration beds or layers 12. Liquid effluent 14 is drawn from the system's septic tank (not shown) through distribution box 16, forced by pump 18 through feed line 20 into top distribution perforated pipe 22a and sprayed over the surface of top filtration bed 12a, through which liquid 14 percolates and drains into second distribution pipe 22b by gravity. The cycle of spraying, percolating and draining of liquid 14 is repeated, flowing through perforated pipes 22b–e onto each of the remaining filtration beds 12b–12e until the treated effluent reaches holding area 24, from which it may be directed through control valve 26 either to be discharged as clean ground water, if sufficiently purified, or recirculated through feed line 20' (shown in dash lines), valve 26', operating in tandem with valve 26, and pump 18 into filtration layers 12 a second time. Circulating air, introduced at 28 into the spaces 30 between layers 12, meets sprayed droplets of effluent 14 at each level to supply oxygen for the purification processes occurring throughout drainfield module 10.

Multi-level drainfield module 10a shown in FIG. 3 is identical to module 10 of FIG. 2 with respect to filtration beds 12a–e, effluent-distribution perforated pipes 22a–e and air spaces 30 between the layers 12. However, unit 10a differs from unit 10 in that effluent 14 is delivered by pump 18 to manifold 32, which provides effluent 14 to all pipes 22a–e simultaneously; when effluent 14 has percolated through to the bottoms of layers 12, it flows into manifold 34 and is directed either to be recycled through conduit 32' by tandem valves 26, 26', or released as clean water through valve 26. Thus, beds 12a–e are used in parallel and recycling may be repeated as necessary.

FIGS. 4 and 5 illustrate two arrangements of perforated distribution pipes for distributing effluent 14 evenly over the surfaces of filtration layers 12. In FIG. 4, pipes 22a–e are shown in continuous sinuous form, with parallel straight runs extending substantially across the width of each layer 12; in FIG. 5, pipes 22'a–e have a helical pattern covering substantially the entire area of each layer 12.

An arrangement of two drainfield modules in side-by-side relationship is shown in FIG. 6. Module 10 is identical to that of FIG. 2, its layers 12 being used in series; effluent 14 is drawn from collection area 24, and delivered by pump 36 into manifold 32 of module 10a'; after percolating through filtration layers 12 therein in parallel simultaneous fashion, effluent 14 flows into manifold 34, from which it may be directed to collection area 24', to pump 36 for recycling, or released as clean water by valve 26'.

For installations where land area is limited and increased capacity is needed, vertical stacking of modules 10 may be an optional solution, as illustrated in FIG. 7. It will be apparent that the total number of filtration layers 12, and the thickness of each layer, may be varied to meet the capacity requirements of each household.

FIG. 8 shows an alternative filtration layer structure housed in structure 38, wherein multiple alternating baffles 40 extend inwardly from the top and bottom of structure 38 into filtration medium 12'. Effluent 14 is introduced through inlet 42, is forced to flow sinuously around baffles 40, following the path indicated by arrows, until it emerges through outlet 44. The prolonged exposure of effluent 14 to filtration medium 12' caused by the baffle arrangement can promote more thorough and more efficient digestion of the viruses in effluent 14; this in turn may permit the use of less filtration layers 38 or somewhat coarser filtration medium 12' to achieve full purification of effluent 14. It is to be noted that the course of effluent 14 through structure 38 may be reversed by pumping effluent 14 into what would now be inlet 44 and siphoning it off from what would now be outlet 42.

The schematic showing in FIG. 9 of conduit 46 coursing through spaces 30 between filtration layers 12 and carrying heat transfer medium therethrough illustrates how a heat pump in the house, (not shown) serviced by drainfield 10, can transfer heat energy from house to drainfield in warm weather, and from drainfield to house in cold, using warmth generated, not only by the biological and chemical digestion and purification reactions occurring in the drainfield, but also by sun.

In FIG. 10, details of structure of drainfield module 10 are disclosed by the enlarged scale of this partial view. Here it may be seen that filtration medium layers 12a and 12b are supported on high-strength reinforced (with glass wool, for example) synthetic resin support floors 48a, 48b, respectively, which retain the particles of filtration medium, but are permeable and porous to effluent 14. Liquid effluent 14, having percolated through each filtration layer 12, is thereby allowed to drain onto tilted collection trays 50a, 50b, into connecting tubes 52a, 52b and distribution perforated pipes 22b, 22c, to be sprayed therefrom in each case onto the next lower filter layer 12. More details of structure to support the weighty filtration layers 12 are shown in FIG. 11, a front view, and FIG. 12, a side view, of drainfield module 10'. Three parallel beams 54 extend upwardly from perforated support floor 48b to the bottom of perforated support floor 48a, and horizontally from the front to the back of module 10', thus holding up filtration layer 12a'; three parallel beams 56 extend upwardly from perforated support floor 48c to the bottom of support floor 48b at right angles to beams 54 and from left to right of module 10', thus supporting filtration layer 12b'; continuing down module 10', beams 54 and 56 are alternated layer by layer to complete the structural support therefor. FIGS. 11 and 12 also illustrate a system of graduated particle size in filtration beds 12a'–12e', from coarsest to finest, with the thickness thereof being reduced graduatedly so that the percolation time through each layer is kept substantially constant.

FIG. 13 illustrates an alternate method of percolating effluent 14 through filter beds 12", by introducing effluent 14 through pipe 22a into the bottom of filter bed 12a" and permitting it to percolate upwardly, to be siphoned off the top of bed 12a" through connecting pipe 58, and to be drained into the bottom of filter layer 12b". In turn, effluent 14 percolates upwardly and is drawn off through a second connecting pipe 58 and delivered to the bottom of the next lower layer. For this embodiment, support plates 60, holding filtration medium layers 12a', 12b', etc. are impervious and impermeable to effluent 14, and may be constructed from materials other than synthetic resin.

The aboveground structure 62 shown in FIG. 14 has translucent walls 64, roof 66, and/or windows 68 for allowing light to enter, enhance and assist in the biological and chemical reactions occurring in liquid effluent 14 as it enters structure 62 through distribution pipe 70 and percolates through drainfield module 72 therein. Air is also introduced at inlet 74 and permitted to circulate through structure 62, which is vented at 76. Filtration medium layers 78a–e are graduated in particle size from the finest at 78a and the coarsest at 78e, and in thickness from the thinnest at 78a and the deepest at 78e, adjusted so that the flow rate of effluent 14 therethrough is substantially equal. Liquid-permeable floors 80, supporting layers 78a–e and in turn supported by alternating cross-beams 82, 84 (corresponding to beams 54,56 in FIGS. 11, 12), may also be varied in thickness and flow rate therethrough to help balance the percolation times of the filtration layer units. Solar panel 67 in roof 66 may provide extra energy both for enhancing the purification process and for storage.

The passage of effluent 14 through drainfield module 72 is direct and gravity-controlled, as effluent 14 drains through each layer 78 and floor 80 to the next lower one until reaching collection area 86, from which it may be withdrawn through outlet 88, to be discharged as clean water or recirculated (not shown). Because of the warmth generated by the digestion process in drainfield 72 and by sun, evaporation of water in structure 62 will cause condensation on the cooler walls 64 thereof; the resulting distilled water will run down walls 64, be collected in chamber 90 and withdrawn through outlet 92.

The concepts and various embodiments of this invention have been disclosed and the best modes of practicing them have been described. It will be evident to those skilled in the art that the elements and methods discussed herein provide the means to analyze the requirements of each proposed septic drainfield installation, to select a combination of these elements and methods most suitable to meet these specific requirements, and to produce thereby a drainfield system of very high efficiency, economy and safety. Those skilled in the art will also be aware that combinations, modifications and substitutions not specifically mentioned herein may well be within the concepts of this invention, which are limited only by the scope of the ensuing claims, wherein:

What is claimed is:

1. A multi-level drainfield for treating the liquid effluent from a home septic tank, said drainfield being positioned as an above-ground installation, which comprises:
   at least one drainfield module, each said drainfield module comprising:
      a plurality of filtration medium layers arranged in vertically stacked relationship, each of said plurality of filtration layers being spaced from the adjacent of said layers to allow the circulation of air therebetween; and
      structural means for supporting each of said plurality of filtration medium layers in said spaced vertically stacked relationship, said structural means comprising:
         a plurality of horizontal support floors, one said support floor holding each of said plurality of filtration medium layers, said floors being retentive of the particles of said filtration medium layer positioned thereon, each said floor being selected from the group consisting of: being permeable and porous to liquid effluent, and bring impervious to liquid effluent; and
         a plurality of sets of multiple parallel support beams, said sets of beams sustaining said plurality of floors, together with said plurality of filtration medium layers filled with liquid effluent, in fixed spaced relationship with each other and extending horizontally substantially along one full dimension of the drainfield model, and extending vertically from one said support floor to the adjacent said support floor, each said support beam set being alternately arranged at right angles to its adacent said support beam set, thus providing necessary strength to support the weighty combination of said floors and said filtration layers flooded with liquid effluent;
   a housing for covering and protecting said at least one drainfield module, which comprises:
      walls and roof of said having means for admitting light into the interior thereof, the energy from said light acting to enhance, assist in and accelerate the effluent chemical and biological purification processes occurring in the liquid effluent being treated in said drainfield module, the sunlight creating a greenhouse effect within said housing; and
      at least one inlet and at least one vent for providing air circulation through the multi-level drainfield;
   means for delivering and distributing the liquid effluent from the septic tank to at least one of said plurality of filtration medium layers in said module for percolation therethrough; and
   means for transferring the percolated liquid effluent from said at least one of said plurality of filtration medium layers to a destination selected from the group consisting of: a second of said plurality of filtration medium layers, said second layer being directly adjacent said at least one of said plurality of filtration medium layers; means for delivering and distributing said percolated liquid effluent for recirculation and repercolation through at least one of said plurality of filtration layers; and means for discharging said percolated liquid effluent as clean water to the area surrounding said housing for said drainfield module.

2. Drainfield as defined in claim 1, wherein the liquid septic tank effluent is directed to percolate through said plurality of filtration medium layers in a manner selected from the group consisting of: in series, and in parallel.

3. Drainfield as defined in claim 1, wherein said plurality of filtration medium layers in said module each range in area from approximately fifteen square feet to over four hundred square feet.

4. Drainfield as defined in claim 1, wherein each of said plurality of filtration medium layers in said module range in thickness from approximately two inches to at least two feet.

5. Drainfield module as defined in claim 1, wherein said plurality of filtration medium layers are composed of a substance selected from the group consisting of: percolable soil, sand, sand, gravel, coal, percolable natural wood particles, percolable synthetic resin particles, and combinations thereof.

6. Drainfield module as defined in claim 1, further comprising a plurality of parallel baffles spacedly mounted in each layer of said plurality of filtration medium layers, said baffles alternately extending upward from the bottom, and downwardly from the top, of each of said layers, whereby the liquid effluent percolating therethrough in either direction is forced to follow a sinuous course.

7. Drainfield module as defined in claim 1, further comprising heat-transfer-medium-carrying tubing extending from a heat pump in the home serviced by the drainfield through all the air spaces between said plurality of filtration medium layers and returning to said heat pump, whereby said tubing transfers warmth and heat energy, from the drainfield to the home in cold weather, and from the home to said drainfield module in hot weather.

8. Drainfield module as defined in claim 1, wherein said means for transferring the percolated liquid effluent comprises the permeability of said plurality of horizontal support floors thereto and further comprises a tilted sub-floor mounted beneath each of said plurality of support floors and a drainpipe connecting each said sub-floor to its adjacent lower filtration medium layer, whereby the percolated liquid effluent drains through each said support floor to each said sub-floor, being directed thereby through each said drainpipe to said next lower filtration medium layer.

9. Drainfield as defined in claim 1, wherein said means for delivering and distributing liquid effluent from the septic tank to said plurality of filtration medium layers comprises a pump and at least one perforated distribution pipe operatively connected thereto for spraying the liquid effluent onto the surface of the uppermost of said plurality of filtration medium layers.

10. Drainfield as defined in claim 9, wherein said at least one perforated distribution pipe is a plurality, with each said distribution pipe other than said at least one pipe being positioned immediately below, and being operatively connected to, the layer of said plurality of filtration medium layers immediately above, whereby the liquid effluent descends downwardly by being sprayed through each of said distribution pipes successively onto each of said filtration medium layers.

11. Drainfield as defined in claim 10, wherein each of said plurality of perforated distribution pipes is formed in a shape to assure spreading the effluent passing therethrough evenly over the entire surface of the corresponding said filtration medium layer, said shape being selected from the group consisting of: a sinuous arrangement of interconnected parallel rows extending across one dimension each said filtration layer, and a helical arrangement extending to a diameter substantially equal to the size of each said filtration layer.

12. Drainfield as defined in claim 1, wherein the delivery of liquid effluent to each of said plurality of filtration medium layers is selected from the group consisting of: spreading the liquid effluent on the upper surface of each said filtration layer to percolate downwardly, and introducing the liquid effluent at the bottom of each said filtration layer to percolate upwardly and to be siphoned off from the top of each said filtration medium layers and delivered to the next lower of said plurality of filtration medium layers.

13. Drainfield as defined in claim 1, wherein said housing roof further comprises solar collecting means mounted thereon.

14. Drainfield as defined in claim 1, wherein the chemical and biological effluent purification processes occurring in said plurality of filtration medium layers generate heat energy which causes evaporation of water therefrom, said evaporated water condensing on said cooler housing inner walls and draining downwardly thereon, further comprising means for collecting and retrieving said condensed water.

15. Drainfield as defined in claim 1, wherein more than one said drainfield module is operatively connected in series to provide greater capacity to the drainfield, said more than one drainfield module being arranged as selected from the group consisting of: vertically stacked on one another, and in side-by-side relationship.

16. A method for treating the liquid effluent from a home septic tank, which comprises:
  providing at least one multi-level drainfield module installed aboveground, each said drainfield module comprising:
    a plurality of filtration medium layers arranged in vertically stacked relationship, each of said plurality of filtration layers being held on a support floor and spaced from the adjacent said layers to allow the circulation of air therebetween; and
    structural means for supporting said plurality of filtration medium layers in said spaced vertically stacked relationship;
  a housing for covering and protecting said at least one drainfield module, which comprises:
    walls and roof of said housing having means for admitting light into the interior thereof, the energy from said light acting to enhance, assist and accerelate the chemical and biological processes occurring in the liquid effluent being treated in said drainfield module; and
    at least one inlet and at least one vent for providing air circulation throughout the multi-level drainfield;
  delivering and distributing the liquid effluent from the septic tank to at least one of said plurality of filtration medium layers in said drainfield module for percolation therethrough, the percolation rate of the liquid effluent through each of said plurality of filtration medium layers being adjusted and controlled to an average rate approximating but not exceeding one inch per hour by at least one of the factors selected by the group consisting of: the filtration medium particle size in said plurality of layers, the thickness of each of said plurality of filtration medium layers, the presence of percolation-slowing baffles in said plurality of filtration medium layers, and the porosity to liquid effluent and thickness of each said support floor, each said floor supporting one of said plurality of filtration medium layers, said percolation rate of the liquid effluent being selected from the group consisting of: equal rate for each of said plurality of filtration medium layers; graduated rate from slowest to fastest down through said plurality of filtration medium layers; and graduated rate from fastest to slowest down through said plurality of filtration medium layers; and
  transferring the percolated liquid effluent from said at least one of said plurality of filtration medium layers to a destination selected from the group consisting of: a second of said plurality of filtration medium layers, said second layer being directly adjacent said at least one of said plurality of filtration medium layers; means for delivering and distributing said percolated liquid effluent for recirculation and repercolation through at least one of said plurality of filtration medium layers and means for discharging said percolated liquid effluent as clean water to the area surrounding said housing for said at least one drainfield module.

* * * * *